US010489228B2

(12) United States Patent
Harsch

(10) Patent No.: US 10,489,228 B2
(45) Date of Patent: Nov. 26, 2019

(54) SAFETY-RELEVANT COMPUTER SYSTEM

(71) Applicant: SIEMENS MOBILITY GMBH, Munich (DE)

(72) Inventor: Waldemar Harsch, Hannover (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/556,211

(22) PCT Filed: Feb. 22, 2016

(86) PCT No.: PCT/EP2016/053647
§ 371 (c)(1),
(2) Date: Sep. 6, 2017

(87) PCT Pub. No.: WO2016/142159
PCT Pub. Date: Sep. 15, 2016

(65) Prior Publication Data
US 2018/0046531 A1 Feb. 15, 2018

(30) Foreign Application Priority Data

Mar. 11, 2015 (DE) .................... 10 2015 204 337

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0739* (2013.01); *G06F 11/1487* (2013.01);
(Continued)

(58) Field of Classification Search
CPC ............ G06F 11/0739; G06F 11/0796; G06F 11/1608; G06F 11/1641; G06F 11/1654
See application file for complete search history.

(56) References Cited

U.S. PATENT DOCUMENTS 5,426,690 A * 6/1995 Hikuma ............ H04M 1/72516
455/411
5,551,047 A 8/1996 Mori et al.
(Continued)

FOREIGN PATENT DOCUMENTS

DE 102007032805 A1 1/2009
DE 102008043374 A1 5/2010
(Continued)

*Primary Examiner* — Charles Ehne
(74) *Attorney, Agent, or Firm* — Laurence Greenberg; Werner Stemer; Ralph Locher

(57) ABSTRACT

A safety-relevant computer system, in particular a railway safety system, contains at least two hardware channels. A memory check results of the channels are fed to at least one comparator, which triggers an error response if the memory check results are not equal. In order to be able to use diverse software programs created by compilers, memory check results of the diverse software programs of each channel are fed to the comparator. The memory check results of a first software program of the first and second channels are compared with each other and the memory check results of a second software program of the first and second channels are compared with each other.

4 Claims, 1 Drawing Sheet

(51) Int. Cl.
*G06F 11/14* (2006.01)
*G06F 11/16* (2006.01)

(52) U.S. Cl.
CPC ...... *G06F 11/1608* (2013.01); *G06F 11/1641* (2013.01); *G06F 11/0796* (2013.01); *G06F 11/1654* (2013.01)

(56) References Cited

U.S. PATENT DOCUMENTS

| | | |
|---|---|---|
| 9,221,492 B2 | 12/2015 | Brenner |
| 2012/0042324 A1* | 2/2012 | Breker ................ G06F 11/1004 718/107 |
| 2013/0268798 A1 | 10/2013 | Schade et al. |
| 2015/0026538 A1* | 1/2015 | Sakai .................. G06F 11/1048 714/764 |
| 2015/0317198 A1* | 11/2015 | Kume ..................... G06F 12/16 714/6.11 |

FOREIGN PATENT DOCUMENTS

| | | |
|---|---|---|
| DE | 102011086530 A1 | 5/2012 |
| DE | 102011053580 A1 | 3/2013 |
| FR | 2992749 A1 | 1/2014 |

* cited by examiner

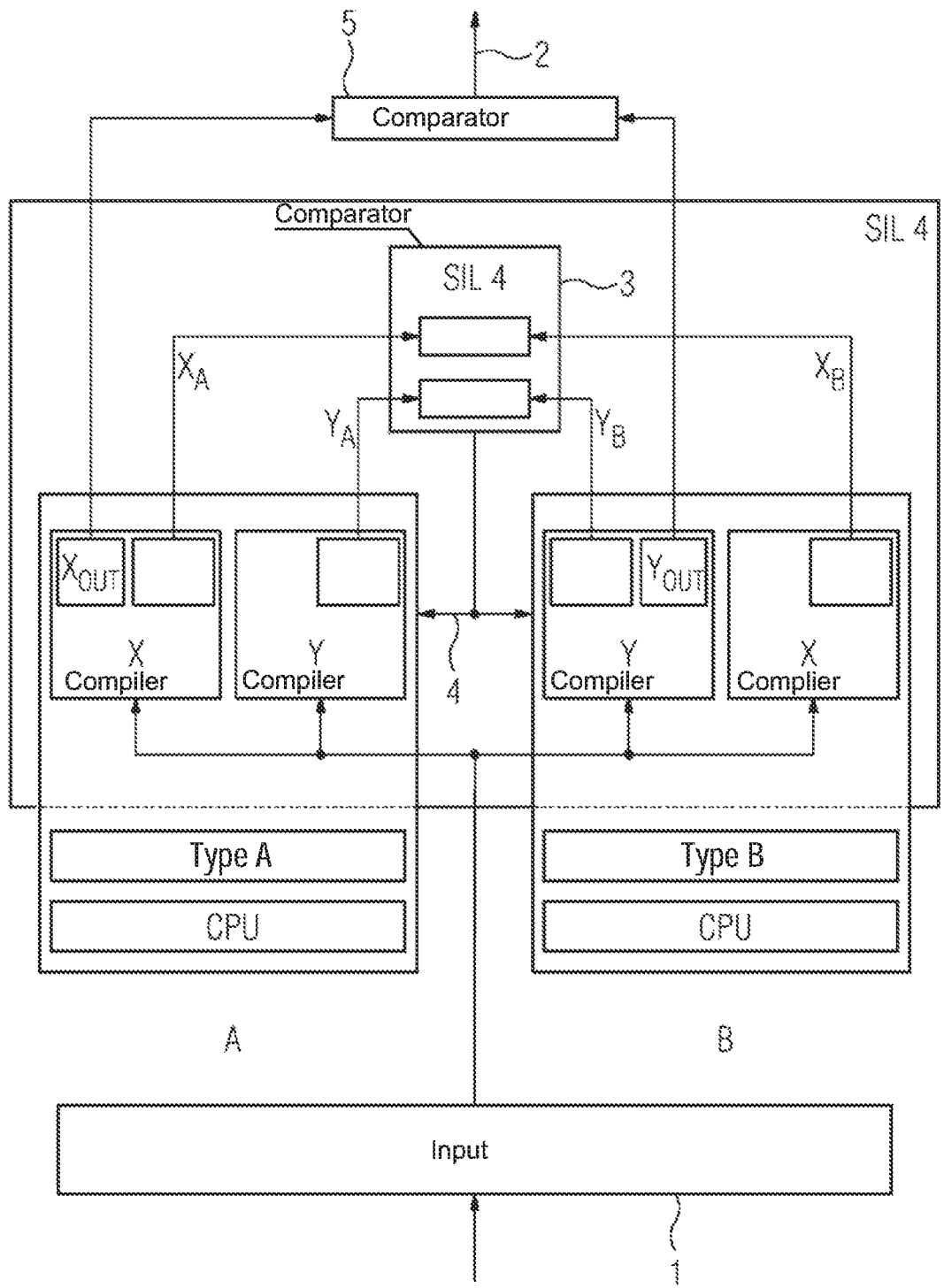

SAFETY-RELEVANT COMPUTER SYSTEM

BACKGROUND OF THE INVENTION

Field of the Invention

The invention relates to a safety-relevant computer system, in particular a railway safety system, comprising at least two hardware channels, wherein memory check results of the channels are forwarded to at least one comparator, which triggers an error response if the memory check results are not equal.

The following description essentially relates to railway safety systems, without the invention being restricted to this specific application. Rather, the invention can be used with a wide range of safety-relevant computer systems, for example for industrial manufacturing processes or all kinds of vehicles.

Railway safety systems must meet very high safety requirements, wherein the highest safety level SIL4 is being increasingly specified. In the CENELEC standard EN50129 the safety levels are defined from SIL0—signaling not secure—to SIL4—signaling extremely secure. Safety-relevant computer systems also include subsystems here, whose error behavior can be considered separately. For example, the actuation of a single light signal on a railway line can represent a safety-relevant system.

In accordance with the CENELEC standard EN50128, the safety concept of computer systems includes not only the multichannel nature of the hardware, but also a memory testing, wherein either the memory contents directly, i.e. the relevant code and data area, including stack, or checksums formed thereon, form the memory check results of the individual channels, which are compared and trigger an error response if they are not equal. The comparability of the memory check results presupposes that the same software is running on all channels. In order to ensure that software parity is actually in place, the corresponding compilers of the individual channels must be validated. The validation of a new compiler is extremely time-consuming and costly. Moreover, there are annual servicing costs during the innovation cycle for new compilers. Until now, the use of diverse compilers has not been possible, since diverse compilers generate different memory layouts, meaning that memory check results of the channels cannot be compared with one another.

SUMMARY OF THE INVENTION

Accordingly, the object of the invention is to provide a safety-relevant computer system of the generic type, which enables the use of diverse compilers.

The object is achieved according to the invention by each channel having at least two diverse software programs built by compilers, the memory check results of which are forwarded to the comparator, wherein the memory check results of the first software program of the first and the second channel are compared with one another and the memory check results of the second software program of the first and the second channel are compared with one another.

In this manner, comparable memory check results for the at least two channels of the safety-relevant computer system are also produced when diverse software programs built by at least two compilers are used. The validation times and costs for ensuring that the software programs of the compilers are absolutely identical, are dispensed with. With a two-channel system, there is for example provision for two software programs built by diverse compilers, the memory check results of which can effectively be compared with one another in a criss-cross manner. In this approach, the memory check results of the first software program, which runs on the first channel, is compared with the memory check results of the first software program which runs of the second channel, and the memory check results of the second software program, which runs on the first channel, is compared with the memory check results of the second software program which runs of the second channel.

In accordance with an added embodiment of the invention, there is provision for each channel and each software program to have precisely one common output module, wherein the output modules of all channels are connected to an output comparator. This means that the first channel only outputs the data compiled by the first compiler and the second channel only outputs the data compiled with the second compiler. The data compiled on the first channel by the second compiler and the data compiled on the second channel by the first compiler are compared without an output module. Instead, this data is suppressed using a dummy function, so that it is ensured that a single channel cannot generate an output which could be interpreted as safe in signal engineering terms. The output modules do not need to be checked separately on their part, since these modules only have an output function and do not generate any safety-relevant data, the corruption of which could have dangerous effects.

The invention will now be described in greater detail with reference to an exemplary embodiment illustrated in the FIGURE.

BRIEF DESCRIPTION OF THE SEVERAL VIEWS OF THE DRAWING

The FIGURE schematically shows the most important components of a safety-relevant computer system.

DESCRIPTION OF THE INVENTION

A computer system with two channels A and B, which each have a central processing unit CPU and an operating system of the type A or B, respectively, is shown. Both channels A and B process the same input data 1 and compile it into identical output data 2, if the data is processed without errors. The input data 1 can be, for example, the element status of field elements, such as switches, signals, level crossings etc., of a railway safety installation, which are compiled in the two channels A and B into output data 2 in order to display the element statuses on a monitor with signaling safety, i.e. SIL4. Additionally, each channel A and B is equipped with diverse software programs, which are built by a compiler X and a second compiler Y. The compilers X and Y generate memory check results $X_A$, $Y_A$ and $Y_B$, $X_B$ in both channels A and B. The memory check results $X_A$, $Y_A$, $Y_B$ and $X_B$, for example checksums, are forwarded to a SIL4 comparator 3. This performs a comparison of the memory check results $X_A$ and $X_B$ with regard to the first software program by the compiler X and a comparison of the memory check results $Y_A$ and $Y_B$ with regard to the second software program by the compiler Y. If the memory check results $X_A$ and $X_B$ with regard to the first software program built by the compiler X and/or the memory check results $Y_A$ and $Y_B$ with regard to the second software program built by the compiler Y are not equal, then a data processing error is present on the first channel A and/or the second channel B, so that the comparator 3 brings about, by reacting on the two channels A and B, an error response 4, preferably a switching off which is safe in signal engineering terms, of the safety-relevant computer system. If the comparator 3 declares an error-free data processing on the two channels A and B, then an output module $X_{OUT}$ of the first software program, built by means of the compiler X, of the first channel A and an output module $Y_{OUT}$ of the second software program, built by means of the compiler Y, of the second channel B each generate outputs, which are forwarded to an output comparator 5 and, if they match, form the output data 2. The two other software programs, namely that of the second compiler Y on the first channel A and that of the first compiler X on the second channel B, do not generate any output data, but rather they are solely used for the comparability of the memory check results $Y_A$ and $X_B$ with the memory check results $X_A$ and $Y_B$ generated by the respective other channel B and A. In this way, it becomes possible to use diverse software programs on compilers X and Y, whereby an extremely elaborate compiler validation can be dispensed with.

The invention claimed is:

1. A safety-relevant computer system, comprising:
   at least one comparator; and
   at least two hardware channels including a first hardware channel and a second hardware channel, wherein memory check results of said hardware channels are forwarded to said at least one comparator, said at least one comparator triggering an error response if the memory check results are not equal, each of said hardware channels having compilers and at least two diverse software programs built by said compilers, the memory check results of said diverse software programs being forwarded to said comparator, wherein the memory check results of a first software program of said first and second hardware channels being compared with one another and the memory check results of a second software program of said first and second hardware channels are compared with one another.

2. The safety-relevant computer system according to claim 1,
   further comprising an output comparator; and
   wherein each of said hardware channels and each of said diverse software programs has precisely one common output module, wherein said output module of all of said hardware channels are connected to said output comparator.

3. The safety-relevant computer system according to claim 1, wherein the safety-relevant computer system is a railway safety system.

4. A method of operating a safety-relevant computer system, which comprises the steps of:
   operating at least two hardware channels including a first hardware channel and a second hardware channel, each of the hardware channels having compilers and at least two diverse software programs being built by the compilers;
   generating memory check results of the diverse software programs of the hardware channels; and
   forwarding the memory check results of the hardware channels to at least one comparator, the at least one comparator triggering an error response if the memory check results are not equal, wherein the memory check results of a first software program of said first and second hardware channels being compared with one another and the memory check results of a second software program of said first and second hardware channels are compared with one another.

* * * * *